US008832410B2

(12) United States Patent
Springberg

(10) Patent No.: US 8,832,410 B2
(45) Date of Patent: Sep. 9, 2014

(54) DISK-BASED STORAGE DEVICE WITH FREQUENTLY ACCESSED PARTITION

(75) Inventor: David M. Springberg, Fort Collins, CO (US)

(73) Assignee: LSI Corporation, San Jose, CA (US)

( * ) Notice: Subject to any disclaimer, the term of this patent is extended or adjusted under 35 U.S.C. 154(b) by 314 days.

(21) Appl. No.: 13/096,698

(22) Filed: Apr. 28, 2011

(65) Prior Publication Data

US 2012/0151176 A1     Jun. 14, 2012

Related U.S. Application Data

(60) Provisional application No. 61/422,832, filed on Dec. 14, 2010.

(51) Int. Cl.
*G06F 12/00* (2006.01)
*G06F 3/06* (2006.01)

(52) U.S. Cl.
CPC ............ *G06F 3/0644* (2013.01); *G06F 3/0613* (2013.01); *G06F 3/0676* (2013.01)
USPC .......................................... 711/173; 711/112

(58) Field of Classification Search
CPC ... G06F 3/0644; G06F 12/122; G06F 3/0676; G06F 3/0613; G06F 2206/1004
USPC ........................................................ 711/173
See application file for complete search history.

(56) References Cited

U.S. PATENT DOCUMENTS 5,778,392 A * 7/1998 Stockman et al. .................... 1/1
5,802,593 A * 9/1998 Grimsrud ...................... 711/165
5,884,093 A   3/1999 Berenguel et al.

(Continued)

FOREIGN PATENT DOCUMENTS

CN        101751225 A      6/2010

OTHER PUBLICATIONS

Dong Ngo, "Seagate Momentus XT (500GB)," CNet Reviews, http://reviews.cnet.com/internal-hard-drives/seagate-momentus-xt-500gb/4505-9998_7-34109211.html, May 24, 2010, 3 pages.

(Continued)

*Primary Examiner* — April Y Blair
*Assistant Examiner* — Michael C Kolb
(74) *Attorney, Agent, or Firm* — Ryan, Mason & Lewis, LLP

(57) ABSTRACT

A hard disk drive or other disk-based storage device comprises a storage disk, a read/write head configured to read data from and write data to the storage disk, and a controller configured to process data received from and supplied to the read/write head and to control positioning of the read/write head relative to the storage disk. The storage disk is partitioned into at least first and second regions, with the first region having a substantially higher average data transfer rate than the second region and being utilized to store data that is accessed more frequently than data stored in the second region. In one embodiment, the data stored in the first region is not stored in the second region or in any other region of the storage disk, and is randomly distributed across a plurality of sectors of the first region. The first region may comprise one or more outer annular zones of the storage disk and the second region may comprise one or more inner annular zones of the storage disk.

21 Claims, 4 Drawing Sheets

(56) References Cited

U.S. PATENT DOCUMENTS

| | | |
|---|---|---|
| 6,324,620 B1 * | 11/2001 | Christenson et al. ......... 711/112 |
| 6,778,346 B2 | 8/2004 | Takayama et al. |
| 7,124,272 B1 * | 10/2006 | Kennedy et al. .............. 711/173 |
| 7,464,250 B2 | 12/2008 | Dayan et al. |
| 7,872,825 B2 | 1/2011 | Sanghvi |
| 2004/0223722 A1 | 11/2004 | Chamberlin et al. |
| 2008/0027905 A1 * | 1/2008 | Jensen et al. ...................... 707/2 |
| 2009/0113160 A1 * | 4/2009 | Ferraro ......................... 711/170 |
| 2009/0237825 A1 * | 9/2009 | Sato et al. ........................ 360/39 |
| 2011/0138148 A1 * | 6/2011 | Friedman et al. ............. 711/173 |

OTHER PUBLICATIONS

Diskeeper Corporation, "Diskeeper 2011 Professional Edition," http://www.diskeeper.com/business/diskeeper/professional/default.aspx, 2011, 2 pages.

* cited by examiner

| ZONE | CAPACITY PER TRACK (KB) | DATA RATE (MHz) |
|---|---|---|
| 0 | 1443 | 1850 |
| 1 | 1423 | 1803 |
| 2 | 1400 | 1756 |
| 3 | 1386 | 1709 |
| 4 | 1364 | 1663 |
| 5 | 1345 | 1616 |
| 6 | 1320 | 1569 |
| 7 | 1300 | 1522 |
| 8 | 1276 | 1475 |
| 9 | 1250 | 1428 |
| 10 | 1221 | 1381 |
| 11 | 1200 | 1334 |
| 12 | 1170 | 1288 |
| 13 | 1135 | 1241 |
| 14 | 1106 | 1194 |
| 15 | 1070 | 1147 |
| 16 | 1030 | 1100 |
| 17 | 1000 | 1053 |
| 18 | 960 | 1006 |
| 19 | 925 | 959 |
| 20 | 880 | 913 |
| 21 | 830 | 866 |
| 22 | 800 | 819 |
| 23 | 748 | 725 |

DISK-BASED STORAGE DEVICE WITH FREQUENTLY ACCESSED PARTITION

RELATED APPLICATION(S)

The present application claims priority to U.S. Provisional Patent Application Ser. No. 61/422,832, filed Dec. 14, 2010 and entitled "Frequently Accessed Partition (FAP) on a Storage Device," the disclosure of which is incorporated by reference herein.

FIELD OF THE INVENTION

The present invention relates generally to storage devices, and more particularly to techniques for improving the operating performance of disk-based storage devices.

BACKGROUND OF THE INVENTION

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum, which is coated with a thin layer of magnetic material. In operation, data is read from and written to the storage disk via a read/write head that is moved precisely across the disk surface by a positioning arm as the disk spins at high speed.

Operating performance measures in conventional HDDs include access time, data transfer time and power consumption. In many conventional arrangements, data is stored randomly across the entire storage disk, and therefore accessing the storage disk to read or write date requires significant movements of the read/write head over large portions of the disk surface, which tends to increase access time, data transfer time and power consumption. There are a number of different software tools available that can re-organize the stored data in order to improve performance, such as defragmentation tools for HDDs. However, such software tools can be costly and inefficient, and generally require user activation, which is undesirable. Also, HDD storage capacity has grown increasingly large (e.g., 500 GB+), and therefore many typical computer installations include a large capacity HDD in which only a small portion of that capacity (e.g., 10% to 20%) is accessed on a regular basis.

Advantageous techniques for providing reduced power consumption in an HDD or other disk-based storage device without substantially detracting from HDD reliability are disclosed in U.S. Pat. No. 7,872,825, entitled "Data Storage Drive with Reduced Power Consumption," which is commonly assigned herewith and incorporated by reference herein. In one or more such techniques, power consumption is reduced in an HDD by varying the supply voltage provided to circuitry within the HDD in response to changes in data transfer rate as different regions of a storage disk are accessed.

However, despite the considerable advances provided by the techniques disclosed in the above-cited U.S. patent, a need remains for further improvements in reducing access time, reducing power consumption and otherwise enhancing the operating performance of an HDD or other type of disk-based storage device.

SUMMARY OF THE INVENTION

Illustrative embodiments of the present invention provide improved HDDs or other types of disk-based storage devices that exhibit enhanced operating performance in terms of reduced access time, data transfer time and power consumption, through the use of a storage disk having what is referred to herein as a frequently accessed partition. The frequently accessed partition separates frequently accessed data from other data stored on the storage disk.

In accordance with one aspect of the invention, a disk-based storage device comprises a storage disk, a read/write head configured to read data from and write data to the storage disk, and a controller configured to process data received from and supplied to the read/write head and to control positioning of the read/write head relative to the storage disk. The storage disk is partitioned into at least first and second regions, with the first region having a substantially higher average data transfer rate than the second region and being utilized to store data that is accessed more frequently than data stored in the second region. The data stored in the first region is preferably not simultaneously stored in the second region or in any other region of the storage disk, and may be randomly distributed across a plurality of sectors of the first region. The first region may comprise one or more outer annular zones of the storage disk and the second region may comprise one or more inner annular zones of the storage disk.

Advantageously, one or more of the illustrative embodiments provide significant improvements in disk-based storage device performance. For example, reductions in access time, data transfer time and power consumption are achieved relative to conventional arrangements such as those in which data is stored randomly across the entire storage disk. More particularly, accesses to data stored in the first region having the higher data transfer rate are generally fast, localized transfers that require substantially shorter seeks and therefore less mechanical movement of the read/write head of the storage device.

DETAILED DESCRIPTION OF THE INVENTION

The invention will be illustrated herein in conjunction with exemplary disk-based storage devices and storage disk partitioning techniques. It should be understood, however, that the invention is more generally applicable to any disk-based storage device in which improved performance in terms of reduced access time, data transfer time and power consumption is desired, and may be implemented using components other than those specifically shown and described in conjunction with the illustrative embodiments.

Figure 1:
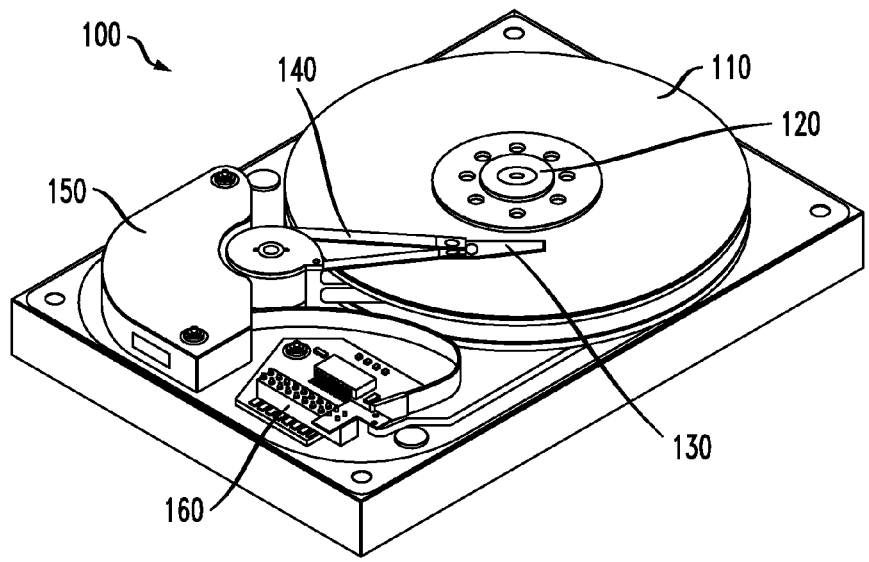
FIG. 1 shows a perspective view of a disk-based storage device in accordance with an illustrative embodiment of the invention.

FIG. 1 shows a disk-based storage device 100 in accordance with an illustrative embodiment of the invention. The disk-based storage device 100 in this embodiment more specifically comprises an HDD that includes a storage disk 110 that is partitioned into multiple regions storing different sets of data based on data access frequency, as will be described in greater detail below. The storage disk 110 has a storage surface coated with a magnetic material capable of storing data in the form of magnetization states. The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. The position of the read/write head over the magnetic surface of the storage disk 110 is controlled by an electromagnetic actuator 150 that is driven by controller circuitry, a portion of which is indicated generally by reference numeral 160. In the perspective view of FIG. 1, the visible portion of the controller circuitry 160 includes a number of connectors, although remaining portions of the controller circuitry not expressly shown in this figure may comprise one or more circuit boards on the opposite side of this assembly, as is typical of conventional arrangements. One or more such connectors may be used to connect the storage device to a host computer or other related processing device.

The electromagnetic actuator 150 and controller circuitry 160 may be collectively viewed as an example of what is more generally referred to herein as a "controller." The term "controller" is intended to be broadly construed so as to encompass, by way of example and without limitation, drive electronics, signal processing electronics, and associated processing and memory circuitry, as well as related mechanic elements utilized to control positioning of a read/write head relative to a storage surface of a storage disk.

It is to be appreciated that, although FIG. 1 shows only a single storage disk 110, read/write head 130, and positioning arm 140, this is by way of illustrative example only, and alternative embodiments of the invention may comprise multiple instances of these and other drive components. For example, one such alternative embodiment may comprise multiple storage disks attached to the same spindle so all such disks rotate at the same speed, and multiple read/write heads and associated positioning arms coupled to the same actuator.

Also, the disk-based storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. The disclosed techniques are applicable without limitation to any rotating disk that has a higher data transfer rate and capacity for its outer annular zones than for its inner annular zones. Those skilled in the art will therefore recognize that a wide variety of other storage device configurations may be used in implementing the invention.

Figure 2:
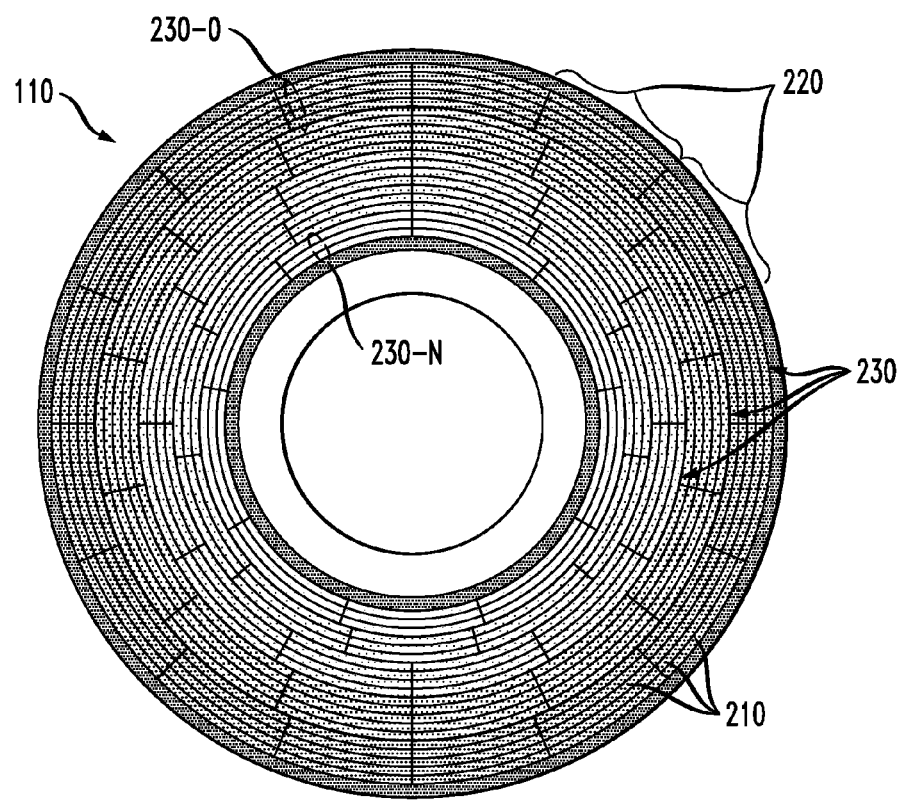
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of equally sized sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the annular zones have the same number of sectors. Those tracks in the outer annular zones have more sectors than those located in the inner annular zones. In this example, it is assumed that the storage disk 110 comprises N+1 annular zones, including an outermost annular zone 230-0 and an innermost annular zone 230-N.

The outer annular zones of the storage disk 110 provide a higher data transfer rate than the inner annular zones. This is in part due to the fact that the storage disk in the present embodiment spins at a constant speed, regardless of the positioning of the read/write head, but the tracks of the inner annular zones are smaller than those of the outer annular zones. Thus, when the read/write head is positioned over one of the tracks of an outer annular zone, it covers a greater linear distance along the disk surface for a given 360° turn of the storage disk than when it is positioned over one of the tracks of an inner annular zone. Such an arrangement is referred to as having constant angular velocity (CAV), since each 360° turn of the storage disk takes the same amount of time, although it should be understood that CAV operation is not a requirement of the present invention. Data bit density is generally constant across the entire storage surface of the disk, which results in higher data transfer rates at the outer annular zones. Since each outer annular zone stores more data than the inner annular zones, the read/write head need not be moved as frequently to read a given amount of data when accessing data in the outer annular zones. Data can therefore be transferred at a higher rate to or from tracks in the outer annular zones than to or from tracks in the inner annular zones.

The storage disk 110 in the present embodiment is partitioned into multiple regions, each of which may comprise one or more of the above-described inner or outer annular zones, with a given region that has a higher average data transfer rate being used to store data that is accessed more frequently that other data stored in one or more other regions having lower average data transfer rates than the given region. This partition of the storage disk based on data access frequency is referred to herein as a "frequently accessed partition" or FAP. Such a partition is used to divide the storage disk into at least first and second regions, with the first region having a substantially higher average data transfer rate than the second region and being utilized to store data that is accessed more frequently than data stored in the second region. The first and second regions are also referred to elsewhere herein as a FAP region and a non-FAP region, respectively. It should be noted, therefore, that the term "partition" is used herein to refer to a partitioned region of a storage disk, as well as to an operation of separating a storage disk into regions.

The data stored in the first region is typically not also stored at the same time in the second region or in any other region of the storage disk. Thus, the data stored in the first region generally represents the only copy of that data on the storage disk, although such an arrangement is not a requirement of the present invention. Also, the data stored in the first region is typically randomly distributed across a plurality of sectors of that region, although again such random distribution is not a requirement of the invention.

In the present embodiment, the above-noted first region having a higher average data transfer rate comprises one or more outer annular zones of the storage disk 110 and the second region having a lower average data transfer rate comprises one or more inner annular zones of the storage disk 110. Thus, for example, the first region may comprise at least the outermost annular zone 230-0 of the storage disk and the second region may comprise at least the innermost annular zone 230-N of the storage disk. The average data transfer rates may differ between the innermost and outermost annular zones in a given embodiment by more than a factor of two.

As one example, provided by way of illustration only, the outermost annular zone may have a data transfer rate of approximately 2.3 GHz, while the innermost annular zone has a data transfer rate of approximately 1.0 GHz. In such an implementation, the HDD may more particularly have a total storage capacity of 500 GB and a spindle speed of 7200 RPM, with the data transfer rates ranging, as noted above, from about 2.3 GHz for the outermost annular zone to about 1.0 GHz for the innermost annular zone. The outermost annular zone may be configured as the frequently accessed partition, and may have a size on the order of about 20 GB, which may be arranged as approximately 15,000 tracks, with approximately 400 sectors per track, and approximately 4 KB of storage per sector. Of course, this is just an example, and other data transfer rates and storage disk configurations may be used in other embodiments. Another illustrative example will be described below in conjunction with FIG. 4.

It should also be appreciated that there may be more than two regions of a storage disk separated by frequently accessed partitions in a given embodiment. For example, there may be three or more separate regions each used to store data of increasing access rate, arranged from the inner portion of the storage disk to the outer portion of the storage disk.

As mentioned previously, data that is accessed more frequently is stored in a partitioned region of the storage disk 110 that has a higher average data transfer rate than other regions of the storage disk. This frequently-accessed data may be at least in part preinstalled in the high data transfer rate region of the storage disk at the time of manufacture of the disk-based storage device 100 or an associated processing device, such as a computer or server in which the storage device is installed. For example, the data stored in the first region may comprise data that is likely to be used very often, such as operating system code, web browser code, security code, application code or other software code to be utilized by the associated processing device. The operating system code may more particularly comprise boot sequence code for the associated processing device. Security programs may include, for example, access control programs and virus scanning programs. Examples of application code include word processing programs or other office programs, and user application programs such as iTunes. Again, these are only illustrative examples, and any of a wide variety of other types of data known to be likely subject to frequent use can be preinstalled or otherwise stored in the high data transfer rate region. For example, data that is not pre-installed but is stored in the high data transfer rate region during normal operation may include user-specific data such as music, picture and video files.

Data can also be moved from a high data transfer rate region to a low data transfer rate region, and vice-versa, based on ongoing monitoring of the frequency at which that data is accessed in actual usage of the disk-based storage device 100. Thus, at least a portion of the data stored in the first region may comprise data initially stored in the second region but subsequently moved from the second region to the first region based on access frequency of the moved data. Similarly, at least a portion of the data stored in the second region may comprise data initially stored in the first region but subsequently moved from the first region to the second region based on access frequency of the moved data. The movement of data to and from different transfer rate regions of the storage disk can be carried out by a controller or an associated processor.

As a more particular example, the storage device 100 may be configured to monitor access frequencies for multiple sectors during normal operation, and to put the most frequently accessed sectors into the frequently accessed partition. Assuming the storage disk is not already full, this movement of data from one or more low data transfer rate regions into the frequently accessed partition would free up space in the low data transfer rate regions for storage of less frequently accessed data.

The monitoring of stored data access frequency could be limited to multiple repetitions of a processing device boot sequence and corresponding initial predetermined periods of operation following those sequences. Alternatively, such repeated boot sequences and corresponding initial periods of operation could be assigned a higher weight than other accesses that occur at other times during normal operation of the storage device. The accumulated weights may be used by the controller or other device element to determine which stored data will remain in or be moved to the frequently accessed partition. The monitored access frequency information may be stored on a per-sector basis in a table that is maintained by storage device firmware associated with the controller circuitry 160.

Figures 3, 4:
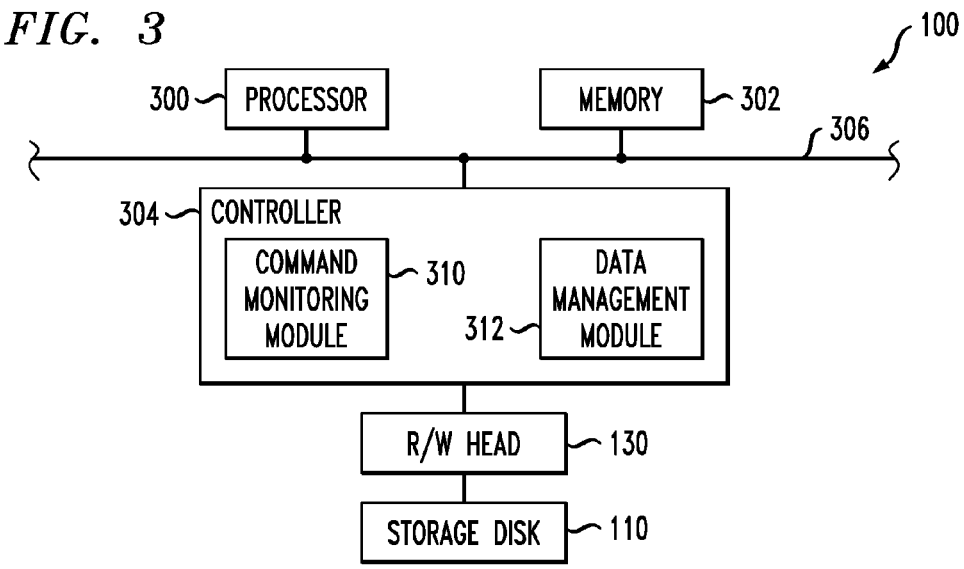
FIG. 3 is a block diagram of a portion of the storage device of FIG. 1.
FIG. 4 shows a table of capacity per track and data transfer rate as a function of storage disk zone in the storage device of FIG. 1.

FIG. 3 shows a portion of the disk-based storage device 100 of FIG. 1. In this view, the disk-based storage device 100 comprises a processor 300, a memory 302 and a controller 304, which communicate over a bus 306. The controller 304 directs the operation of the read/write head 130 in reading data from and writing data to the storage disk 110. The controller 304 in this embodiment thus directs the storage of particular data in the above-noted partitioned first and second regions. The controller 304 in the present embodiment more particularly includes a command monitoring module 310 for monitoring read/write commands and a data management module 312 for moving data between FAP and non-FAP regions of the storage disk 110. As indicated previously, the term "controller" as used herein is intended to be broadly construed, and in this embodiment is assumed to comprise controller circuitry 160 as well as associated mechanical elements such as positioning arm and electromagnetic actuator 150. In other embodiments, a controller may comprise at least a portion of the processor 300 and memory 302, or other storage device elements.

The command monitoring module 310 maintains FAP sector access counters for respective sectors of the FAP region and also maintains non-FAP sector access counters for respective sectors of the non-FAP region, as will be described in greater detail below in conjunction with FIG. 5. The data management module 312 moves data between the FAP and non-FAP regions based on relative values of the FAP and non-FAP sector access counters, as will be described in greater detail below in conjunction with FIG. 6. It should be noted that such background data movement does not increase overall power consumption. This is because the FAP region is configured such that data is not moved very often as compared to the large number of accesses to the FAP region that reduce power consumption, so overall power consumption is reduced.

In the present embodiment, certain operations of the controller 304 may be directed by processor 300, which executes code stored in electronic memory 302. For example, the processor 300 may be configured to execute code stored in the memory for establishing and maintaining the partition of the storage disk 110 into multiple regions having different average data transfer rates, via the modules 310 and 312 of controller 304, and the read/write head 130. Thus, at least a portion of one or more of the modules 310 and 312 may be implemented at least in part in the form of software code.

The memory 302 may comprise electronic memory such as random access memory (RAM) or read-only memory (ROM), in any combination. The memory 302 is an example of what is more generally referred to herein as a "computer-readable storage medium." Such a medium may of course also be writable. The processor 300, memory 302 and controller 304 may be implemented at least in part in the form of one or more integrated circuits, such as an otherwise conventional system-on-chip (SOC) integrated circuit designed for use in an HDD and suitably modified to support a frequently accessed partition of storage disk 110 as disclosed herein. An example of such an SOC that may be modified to incorporate aspects of the present invention is disclosed in the above-cited U.S. Pat. No. 7,872,825.

Other types of integrated circuits that may be used to implement processor, memory or controller elements of a given embodiment include, for example, a microprocessor, digital signal processor (DSP), application-specific integrated circuit (ASIC), field-programmable gate array (FPGA) or other integrated circuit device.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Although shown as part of the disk-based storage device 100 in the present embodiment, the processor 300 and memory 302 may be implemented at least in part within an associated processing device, such as a host computer or server in which the storage device is installed. Accordingly, elements 300 and 302 in the FIG. 3 embodiment may be viewed as being separate from the disk-based storage device 100, or as representing composite elements each including separate processing or memory circuitry components from both the storage device and its associated processing device.

The separation of the disk-based storage disk 110 into different regions using one or more frequently accessed partitions as disclosed herein can be implemented at least in part based on an initial determination of data transfer rates that is carried out by a manufacturer of the storage device 100 or other associated entity.

An example of data transfer rates determined for respective annular zones 230 of the storage disk 110 is shown in FIG. 4. In this example, the storage disk includes N+1=24 annular zones, and thus N=23. The fastest annular zone, annular zone 0 corresponding to annular zone 230-0 in FIG. 2, has a data transfer rate of 1850 MHz and a capacity per track of 1443 KB. The slowest annular zone, annular zone 23 corresponding to annular zone 230-N in FIG. 2, has a data transfer rate and capacity per track of only 725 MHz and 748 KB, respectively. Thus, the data transfer rate varies by more than a factor of two in this example when moving from the outermost annular zone to the innermost annular zone. There are about 11,000 tracks per annular zone in this exemplary storage disk.

The particular data transfer rates and other features referred to in this example are presented for purposes of illustration only, and should not be construed as limiting in any way. Also, the determination of data transfer rates may be done during normal operation of the storage device, after it is deployed in the field. The invention therefore does not require that the placement of the frequently accessed partition or the size and location of the regions having different average data transfer rates be determined prior to deployment. Such determinations may be made and periodically adjusted in real time as the storage device is in actual use.

The term "average data transfer rate" as used herein is intended to be broadly construed, and may refer to data transfer rates such as those listed in the FIG. 4 example that are measured or otherwise determined during manufacture or testing of the disk-based storage device 100, or data transfer rates that are at least in part measured or otherwise determined during normal operation of the storage device. The illustrative embodiments of the present invention therefore do not require the use of any particular measurement technique or other technique for determining average data transfer rates. Such rates may refer to actual measured rates, approximate rates, or estimated rates, in any combination.

Examples of operations associated with the controller 304 in one or more illustrative embodiments will now be described with reference to the flow diagrams of FIGS. 5 and 6. In these examples, it is assumed that the disk-based storage device 100 is coupled to a computer or other host processing device that generates read/write commands for reading data from and writing data to the storage disk 110 via the controller 304 and read/write head 130. It will also be assumed that the FAP region comprises outermost annular zone 230-0 and the non-FAP region comprising the N remaining annular zones 230-1 through 230-N of the storage disk 110. The flow diagram of FIG. 5 shows command monitoring operations that may be implemented at least in part by command monitoring module 310 of controller 304, while the flow diagram of FIG. 6 shows data management operations that may be implemented at least in part by data management module 312.

Figure 5:
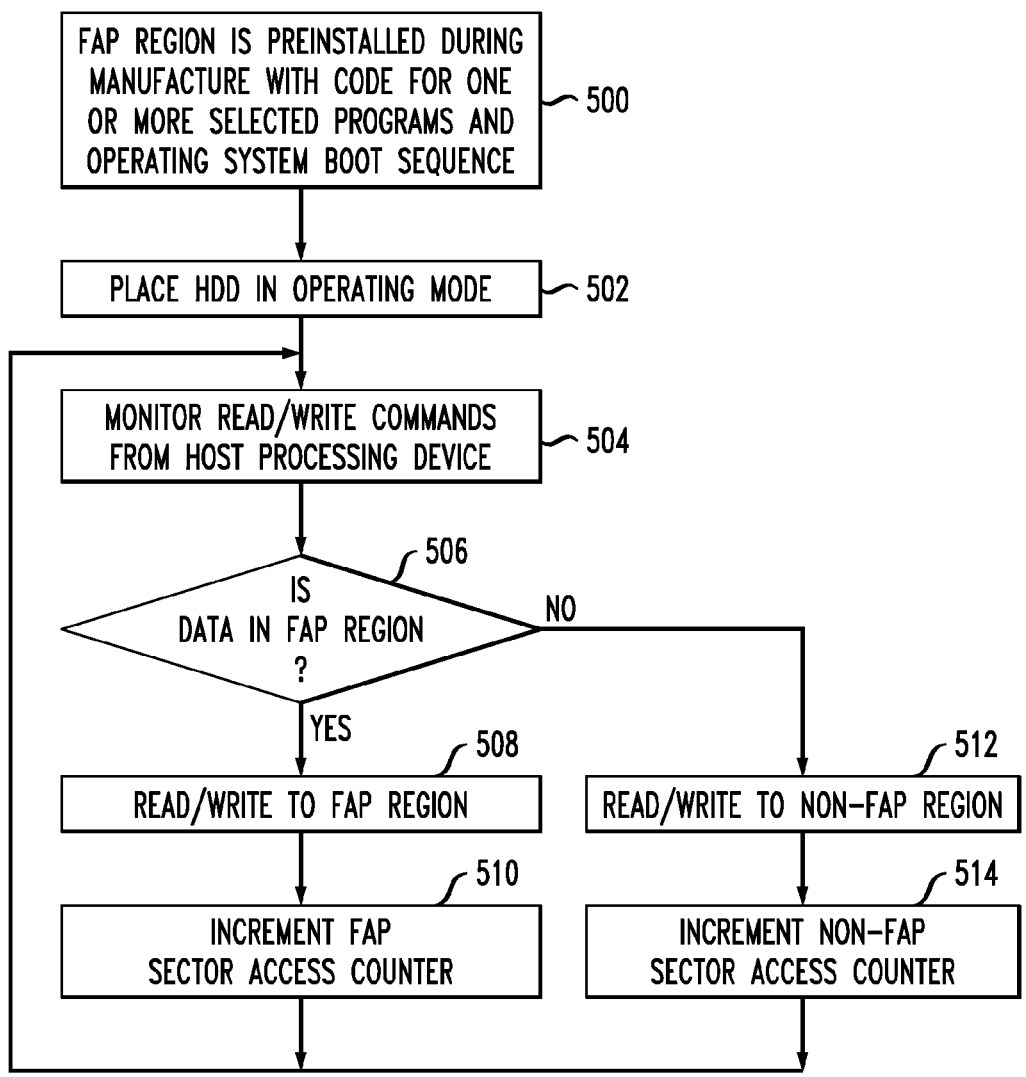
FIG. 5 is a flow diagram of a monitoring process implemented in the storage device of FIG. 1 in an illustrative embodiment.

Referring now to FIG. 5, in step 500 the FAP region is preinstalled during manufacture with software code for one or more selected programs and for an operating system boot sequence. The one or more selected programs may comprise popular programs such as those described previously, including, for example, a web browser, a security program, word processing or other application programs, etc. In step 502, the storage device is deployed in the field and enters an operating mode which involves a host processing device reading from and writing to the storage disk. The controller 304 via command monitoring module 310 monitors read/write commands from the host processing device in step 504. A determination is made for each such command in step 506 regarding whether or not the data to be read or written based on the command is data within the FAP region. If the data to be read or written responsive to a given read/write command is associated with a sector of the FAP region, it is read from or written to that region in step 508, and the corresponding FAP region sector access counter is incremented in step 510. If the data to be read or written responsive to the given read/write command is instead associated with a sector of the non-FAP region, it is read from or written to that region in step 512, and the corresponding non-FAP region sector access counter is incremented in step 514. Following execution of step 510 or 514 for the given read/write command, the process returns to step 504 as shown to continue to monitor additional read/write commands from the host processing device.

Figure 6:
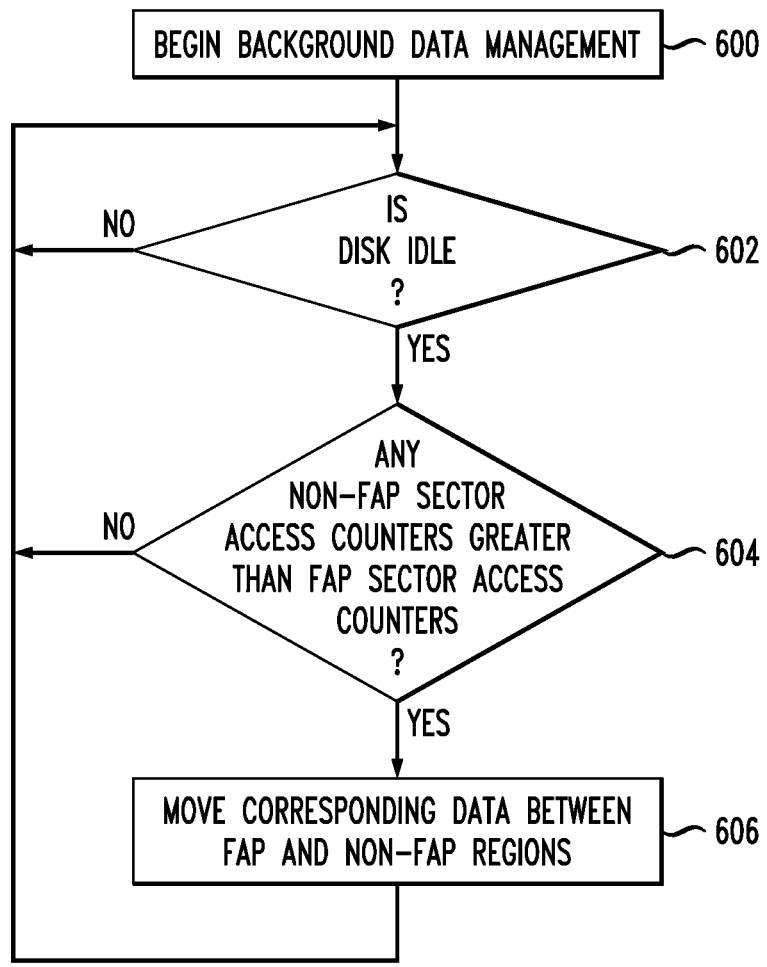
FIG. 6 is a flow diagram of a data management process implemented in the storage device of FIG. 1 in an illustrative embodiment.

With reference now to FIG. 6, a background data management process is initiated in step 600. A determination is made in 602 as to whether or not the storage disk is idle. If the storage disk is idle, the process moves to step 604, and otherwise returns to repeat step 602 as indicated. In step 604, the non-FAP sector access counters are compared to the FAP sector access counters. If there is at least one non-FAP sector access counter that is greater than the FAP sector access counters, that non-FAP sector is moved into the FAP region as indicated in step 606. Assuming the FAP region was already full prior to this move, the FAP sector with the lowest access count is simultaneously moved into the non-FAP region. Thus, a non-FAP sector having a high access count is swapped with a FAP sector having a low access count. The difference between the access counts that causes data to be swapped between FAP and non-FAP regions may be determined based on a programmable threshold.

Figure 7:
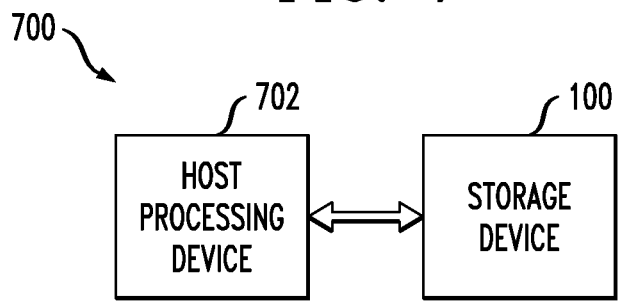
FIG. 7 illustrates interconnection of the storage device of FIG. 1 with a host processing device in a data processing system.

FIG. 7 illustrates a processing system 700 comprising the disk-based storage device 100 coupled to a host processing device 702, which may be a computer, server, communication device, etc. Although shown as a separate element in this figure, the storage device may be incorporated into the host processing device. The read/write commands referred to in step 504 of FIG. 5 may originate from the host processing device 702, which may comprise processor and memory elements similar to those previously described in conjunction with FIG. 3.

The various process operations shown in FIGS. 5 and 6 are presented by way of illustrative example, and should not be construed as limiting in any way. In other embodiments, additional or alternative processing steps may be used, and the ordering of such steps may be varied relative to the arrangements shown. For example, in the data management process of FIG. 6, multiple sectors may be swapped substantially simultaneously between the FAP and non-FAP regions based on the relative values of the access counters. Thus, the data management process could be performed on a partial track or full track basis. Also, the access counts could be weighted using the weighting techniques described previously herein.

The frequently accessed partition of storage disk 100 considerably reduces access time, data transfer time and power consumption, by storing the most frequently accessed data in a region of the disk that has a relatively high average data transfer rate. Data may be preinstalled permanently in that high data transfer rate region, or data may be dynamically moved to and from that region as the monitored access frequency of that data changes. The frequently accessed partition itself is entirely transparent to the storage device user, although the improved operating performance of the device will be apparent.

Accesses to data stored in the high data transfer rate region are generally fast, localized transfers that require substantially shorter seeks and therefore less mechanical movement of the read/write head 130 and positioning arm 140 than would be required absent the partition, which translates to lower access time, data transfer time and power consumption. The frequently accessed partition coupled with dynamic movement of data to and from the high data transfer rate region provides a substantial improvement over conventional defragmentation tools and other software tools. It is particularly useful in the many typical computer installations that include a large capacity HDD (e.g., 500 GB+) but in which only a small portion of that capacity (e.g., 10% to 20%) is accessed on a regular basis. As indicated previously, significant reductions in the seek time of the read/write head across the storage disk serve to reduce access time, data transfer time and power consumption.

Again, it should be emphasized that the above-described embodiments of the invention are intended to be illustrative only. For example, other embodiments can use different types and arrangements of storage disks, read/write heads, controller circuitry and other storage device elements for implementing the described functionality. Also, different types of partitioning arrangements may be used to separate a given storage disk into different regions for storing data based on access frequency. These and numerous other alternative embodiments within the scope of the following claims will be apparent to those skilled in the art.

What is claimed is:

1. A storage device comprising:
a storage disk;
a read/write head configured to read data from and write data to the storage disk; and
a controller configured to process data received from and supplied to the read/write head and to control positioning of the read/write head relative to the storage disk;
wherein the storage disk is partitioned into at least first and second regions;
the first region having a higher average data transfer rate than the second region and being utilized to store data that is accessed more frequently than data stored in the second region;
wherein the controller is configured to maintain access counters for respective portions of the first and second regions and to move data between the first and second regions based on relative weighted values of the access counters;
wherein the controller is further configured to compare an access count of the portion of the first region with an access count of the portion of the second region, and to replace data from the portion of the first region with data from the portion of the second region responsive to the first region being full and the access count of the portion of the first region being less than the access count of the portion of the second region, wherein the replacement moves data from the portion of the first region to the portion of the second region, in conjunction with moving data from the portion of the second region to the portion of the first region.

2. The storage device of claim 1 wherein the storage device comprises a hard disk drive.

3. The storage device of claim 1 wherein the data stored in the first region is not simultaneously stored in the second region or in any other region of the storage disk.

4. The storage device of claim 1 wherein the data stored in the first region is randomly distributed across a plurality of sectors of that region.

5. The storage device of claim 1 wherein the first region comprises one or more outer annular zones of the storage disk and the second region comprises one or more inner annular zones of the storage disk.

6. The storage device of claim 1 wherein the first region comprises at least an outermost annular zone of the storage disk and the second region comprises at least an innermost annular zone of the storage disk.

7. The storage device of claim 1 wherein the first region has an average data transfer rate that is at least twice the average data transfer rate of the second region.

8. The storage device of claim 1 wherein the data stored in the first region comprises preinstalled software code for an associated processing device including at least one of operating system code and web browser code.

9. The storage device of claim 8 wherein the operating system code comprises boot sequence code for the processing device.

10. The storage device of claim 1 wherein at least a portion of the data stored in the first region comprises data initially stored in the second region but subsequently moved from the second region to the first region based on access frequency of said moved data.

11. The storage device of claim 1 wherein at least a portion of the data stored in the second region comprises data initially stored in the first region but subsequently moved from the first region to the second region based on access frequency of said moved data.

12. The storage device of claim 1 wherein the controller is coupled to a processor and a memory, the processor being configured to execute code stored in the memory for establishing and maintaining said partition of the storage disk via the controller and the read/write head.

13. The storage device of claim 1 wherein:
a first weight is assigned to data comprising boot sequence code and data utilized for corresponding initial predetermined periods of operation following the boot sequence; and
a second weight is assigned to data utilized during normal operation of the device.

14. The storage device of claim 1, wherein:
the storage disk comprises a plurality of concentric tracks subdivided into a plurality of sectors; and
each access counter respectively records an access count of a sector of the plurality of sectors.

15. The storage device of claim 1, wherein the controller is further configured to calculate a difference between the access count of the portion of the first region and the access count of the portion of the second region, compare the difference to a threshold, and perform the replacement when the difference exceeds the threshold.

16. A method comprising:
partitioning a storage disk of a storage device into at least first and second regions;
reading data from and writing data to the storage disk;
maintaining access counters for respective portions of the first and second regions;
moving data between the first and second regions based on relative weighted values of the access counters;
comparing an access count of the portion of the first region with an access count of the portion of the second region; and
replacing data from the portion of the first region with data from the portion of the second region;

wherein the first region has a higher average data transfer rate than the second region and is utilized to store data that is accessed more frequently than data stored in the second region; and
wherein the replacing is performed responsive to the first region being full and the access count of the portion of the first region being less than the access count of the portion of the second region, and moves data from the portion of the first region to the portion of the second region, in conjunction with moving data from the portion of the second region to the portion of the first region.

17. The method of claim 16 wherein one or more of the access counters are maintained on a per-sector basis.

18. A non-transitory computer-readable storage medium having embodied therein executable code for performing the steps of the method of claim 16.

19. A processing system comprising:
a processing device; and
a storage device coupled to the processing device and comprising at least one storage disk partitioned into at least first and second regions;
the first region having a higher average data transfer rate than the second region and being utilized to store data that is accessed more frequently than data stored in the second region;
wherein the processing device is configured to maintain access counters for respective portions of the first and second regions and to move data between the first and second regions based on relative weighted values of the access counters;
wherein the processing device is further configured to compare an access count of the portion of the first region with an access count of the portion of the second region, and to replace data from the portion of the first region with data from the portion of the second region responsive to the first region being full and the access count of the portion of the first region being less than the access count of the portion of the second region, wherein the replacement moves data from the portion of the first region to the portion of the second region, in conjunction with moving data from the portion of the second region to the portion of the first region.

20. The system of claim 19 wherein the processing device comprises a computer that incorporates the storage device.

21. The system of claim 19 wherein the storage device comprises a hard disk drive.

* * * * *